US010643485B2

(12) United States Patent
Ahuja et al.

(10) Patent No.: US 10,643,485 B2
(45) Date of Patent: May 5, 2020

(54) GAZE BASED CLASSROOM NOTES GENERATOR

(71) Applicant: International Business Machines Corporation, Armonk, NY (US)

(72) Inventors: Karan Ahuja, New Delhi (IN); Kuntal Dey, New Delhi (IN); Utkarsh Dwivedi, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/474,475

(22) Filed: Mar. 30, 2017

(65) Prior Publication Data

US 2018/0286260 A1 Oct. 4, 2018

(51) Int. Cl.
*G09B 5/00* (2006.01)
*G09B 5/08* (2006.01)
(Continued)

(52) U.S. Cl.
CPC .............. *G09B 5/08* (2013.01); *G06F 3/013* (2013.01); *G09B 5/02* (2013.01)

(58) Field of Classification Search
CPC ... G09B 5/00; G09B 5/08; G09B 5/10; G09B 5/12; G06F 3/013
See application file for complete search history.

(56) References Cited

U.S. PATENT DOCUMENTS 9,171,578 B2  10/2015  Lu et al.
9,958,939 B2   5/2018  Ghajar
(Continued)

FOREIGN PATENT DOCUMENTS

CN    104991642 A   10/2015
CN    105426399 A   3/2016
(Continued)

OTHER PUBLICATIONS

Konig et al. A Nonparametric Method for Detecting Fixations and Saccades using Cluster Analysis: Removing the Need for Arbitrary Thresholds. [online], published Apr. 30, 2014. [retrieved on Apr. 5, 2019]. Retrieved from the Internet. <URL: https://www.ncbi.nlm.nih.gov/pmc/articles/PMC4091910/> (Year: 2014).*
(Continued)

*Primary Examiner* — Peter R Egloff
(74) *Attorney, Agent, or Firm* — Amin, Turocy & Watson, LLP

(57) ABSTRACT

Techniques are provided for creating presentation notes based upon gaze tracking information associated with observers of a presentation. In one example, a computer-implemented method comprises: obtaining, by a system operatively coupled to a processor, gaze information associated with observers of a presentation; determining, by the system, respective content clarity scores for content elements of the presentation based on a content clarity function; selecting, by the system, respective content from one or more content sources for the content elements based on the respective content clarity scores; and generating, by the system, presentation notes based on the presentation and the selected respective content for the content elements of the presentation.

13 Claims, 10 Drawing Sheets

(51) Int. Cl.
*G06F 3/01* (2006.01)
*G09B 5/02* (2006.01)

(56) References Cited

U.S. PATENT DOCUMENTS

| | | |
|---|---|---|
| 10,068,490 B2 | 9/2018 | Hibbs et al. |
| 2006/0116861 A1 | 6/2006 | Kaplan et al. |
| 2008/0282167 A1* | 11/2008 | Beamish ................ G09B 5/02 715/730 |
| 2013/0224718 A1* | 8/2013 | Woodward ............. G09B 7/00 434/350 |
| 2014/0354533 A1 | 12/2014 | Swaminathan |
| 2015/0281887 A1 | 10/2015 | Johnson et al. |
| 2016/0299505 A1* | 10/2016 | Ohara ................. B25J 11/0005 |
| 2017/0256172 A1* | 9/2017 | Kil ................... G06Q 10/06393 |
| 2018/0203834 A1 | 7/2018 | Watanabe |

FOREIGN PATENT DOCUMENTS

| | | |
|---|---|---|
| CN | 106462869 A | 2/2017 |
| JP | 2016181245 A | 10/2016 |
| WO | 2016146486 A1 | 9/2016 |

OTHER PUBLICATIONS

Nguyen, et al., "Gaze-based Notetaking for Learning from Lecture Videos," CHI Conference on Human Factors in Computing Systems (2016), 5 pages.

Fang-Ying, et al., "Tracking learners' visual attention during a multimedia presentation in a real classroom." Computers & Education, vol. 62, Mar. 2013, pp. 208-220.

Internation Search Report and Written Opinion for International Application Serial No. PCT/IB2018/052084 dated Jul. 11, 2018, 9 pages.

List of IBM Patents and Applications Treated as Related.

Non-Final Office Action received for U.S. Appl. No. 15/842,334 dated Sep. 6, 2019, 22 pages.

* cited by examiner

GAZE BASED CLASSROOM NOTES GENERATOR

BACKGROUND

The subject invention relates generally to creating presentation notes based upon gaze tracking information associated with observers of a presentation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. One or more embodiments described herein include a system, computer-implemented method, and/or computer program product, in accordance with the present invention.

An exemplary system embodiment comprises a memory that stores computer executable components; and a processor that executes the computer executable components stored in the memory. The computer executable components can include: a gaze tracking component that obtains gaze information associated with observers of a presentation; a content recommendation component that: determines respective content clarity scores for content elements of the presentation based on a content clarity function; and selects respective content from one or more content sources for the content elements based on the respective content clarity scores; and a notes generation component that generates presentation notes based on the presentation and the selected respective content for the content elements of the presentation.

Other embodiments include a computer-implemented method and a computer program product.

DETAILED DESCRIPTION

Figure 1:
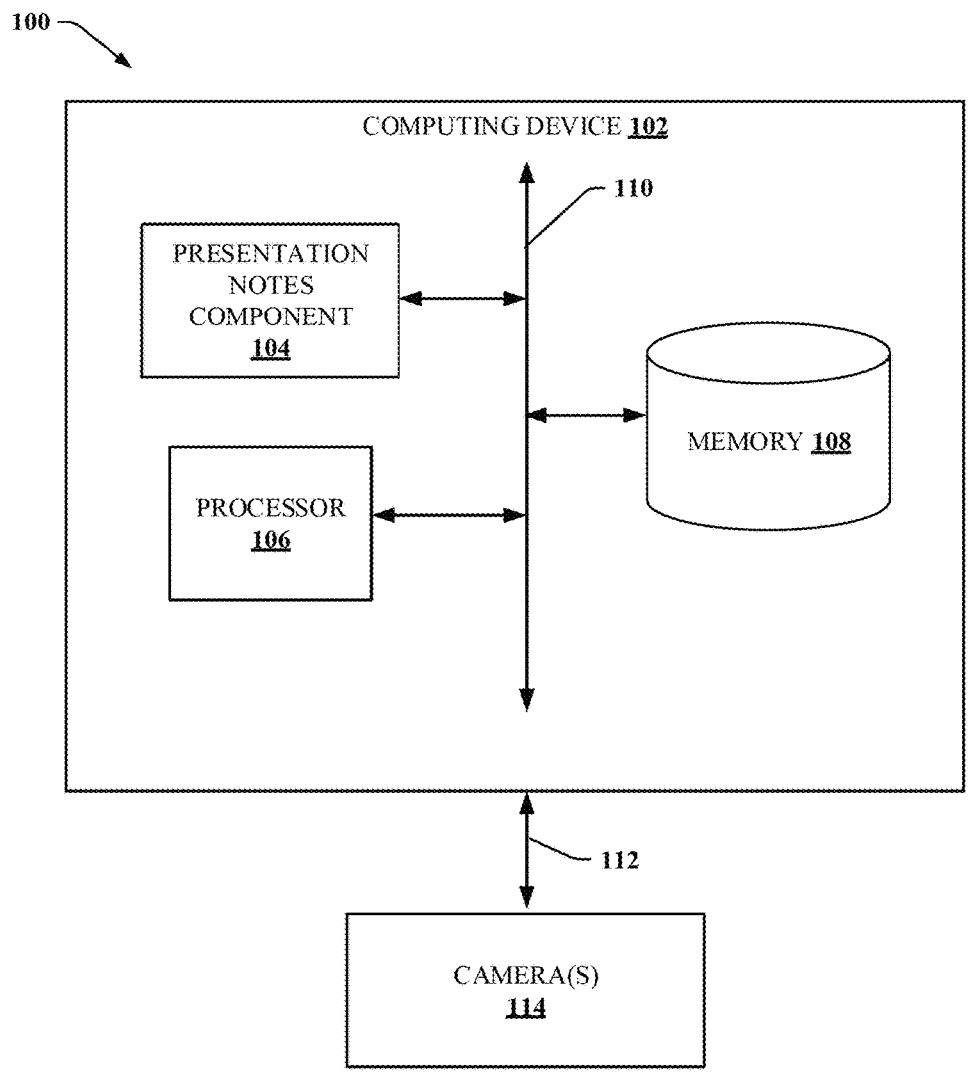
FIG. 1 illustrates an example, non-limiting system in accordance with one or more embodiments of the present invention.

The following detailed description is merely illustrative and is not intended to limit embodiments and/or application or uses of embodiments. Furthermore, there is no intention to be limited by any express or implied information presented in the preceding Background or Summary sections, and/or in the following detailed description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details.

Notetaking during presentations and/or consumption of content can be an essential learning activity, helping store and reinforce information taught during the presentation or otherwise consumed by an observer of the content. A few non-limiting examples of a presentation include a classroom presentation, a lecture presentation, a training seminar, etc. Notes can serve as a guide to information in the presentation, course, books, and/or other material. Notetaking can be an observer's (e.g., student, lecture attendee, participant, or any other suitable observer of a presentation and/or content) synopsis of the presentation, a tool for recalling important points regarding the presentation, and/or a reflection of an observer's understanding of the presentation. However, presentations can leave little time for an observer to take notes. Further, with large presentation forums (e.g., large classrooms, large lecture halls, or any other suitable presentation forum) and short presentation times, a presentation session might not be able to connect the presentation content elements together and/or with associated content. Such associated content can include a variety of associated learning material (e.g., books, articles, white papers, massive open online course (MOOC) video, animation, multimedia, audio recordings, and/or other associated content).

By way of overview and example only, one or more exemplary embodiments of the invention can automatically generate notes, based on gaze tracking information associated with observers of a presentation, and metadata and heuristics associated with the presentation. For example, meta data and heuristics can be obtained for a presentation from a source associated with the presentation, such as from a presenter, teacher, lecturer, author of the presentation, knowledge base, content database, or any other suitable source associated with the presentation. As a presentation is presented to a set of observers, gaze tracking information associated with observers can be obtained. Based on the gaze tracking information, respective attentions scores are generated for content elements of the presentation. Using the metadata, heuristics, and attention scores, respective content clarity levels are determined for the content elements of the presentation. Based on the respective content clarity levels, respective content is selected for the content elements of the presentation, and presentation notes are generated for the presentation using the respective selected content and the content elements of the presentation.

By way of overview and example only, eye gaze estimation can refer to detecting a point (e.g., gaze point) in a given coordinate space at which an observer (e.g., such as a human or animal) is looking. For example, a camera can capture an image of a head, and using 3D landmarks (e.g., facial or head landmarks) and a determination of a pose of an eye and/or head, a gaze vector associated with the eye and/or head can be estimated. Eye gaze tracking can refer to detecting respective points (e.g., gaze points) in a given space at which the observer is looking over time.

It is to be appreciated that some embodiments disclosed herein can automatically generate presentation notes for a group of observers of a presentation and/or for an individual observer of the presentation. For example, presentation notes can be generated based on gaze tracking information aggregated for a plurality of observers of the presentation. In another example, presentation notes can be generated based on gaze tracking information for a single observer (e.g., where the presentation is presented to the single observer or where the presentation is presented to a plurality of observers that include the single observer) of the presentation.

For illustration purposes only, examples presented below will discuss generating presentation notes for a group of observers of a presentation.

One or more embodiments of the subject invention are directed to computer processing systems, computer apparatus, computer-implemented methods, and/or computer program products that facilitate efficiently, effectively, and automatically (e.g., without direct human involvement) generating presentation notes based upon gaze tracking information associated with observers of a presentation, and metadata and heuristics associated with the presentation. Such computer processing systems, computer-implemented methods, computer apparatus and/or computer program products can employ hardware and/or software to solve problems that are highly technical in nature (e.g., adapted to generate presentation notes based upon gaze tracking information associated with observers of a presentation, and metadata and heuristics associated with the presentation) that are not abstract and that cannot be performed as a set of mental acts by a human. For example, one or many humans, cannot efficiently, accurately and effectively manually gather and analyze thousands of data elements related to performing gaze tracking for a group of observers of a presentation in real-time from one or more live streams (e.g., series, sequence) of captured images in a real-time network based computing environment, and generate presentation notes based upon gaze tracking information associated with the observers of a presentation, and metadata and heuristics associated with the presentation in a timeframe that would be useful to a classroom of students for learning purposes during a grading period. One or more embodiments of the subject computer processing systems, methods, apparatuses and/or computer program products can enable the automated real-time, gaze tracking for a group of observers of a presentation from a live stream of captured images, and automated generation of presentation notes based upon gaze tracking information associated with the observers of a presentation, and metadata and heuristics associated with the presentation. By employing automated real-time, gaze tracking for a group of observers of a presentation from a live stream of captured images, and automatically generating presentation notes based upon gaze tracking information associated with the observers of a presentation, and metadata and heuristics associated with the presentation, the processing time and/or accuracy associated with the existing automated presentation notes generation is substantially improved.

Additionally, the invention includes technical features related to technological advancements in real-time gaze tracking based automatic presentation notes generation that have not been previously addressed in this manner. Further, one or more embodiments of the subject techniques can facilitate improved performance of automated presentation notes generation, that provides for more efficient usage of storage resources, processing resources, and network bandwidth resources to provide highly granular and accurate real-time gaze tracking based presentation notes generation for observers of a presentation from a live stream of captured images. For example, by providing accurate presentation notes based on gaze tracking information from a live stream of captured images, wasted usage of processing, storage, and network bandwidth resources can be avoided by mitigating the need for extra electronic communication between observers to exchange presentation notes, and/or between observers and presenters get clarify portions of the presentation.

By way of overview, aspects of systems, apparatuses or processes in accordance with the present invention can be implemented as machine-executable component(s) (software) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

FIG. 1 illustrates an example, non-limiting system 100 in accordance with one or more embodiments of the present invention. Repetitive description of like elements employed in one or more embodiments described herein is omitted for sake of brevity.

As shown in FIG. 1, the system 100 can include a computing device 102, one or more networks 112 and one or more cameras 114. Camera(s) 114 can be any camera that can create and/or capture one or more (e.g., a stream of) images in a suitable (visible, infra-red, ultra-violet, etc.) range of the spectrum. A few, non-limiting, examples of a camera include: a monocular camera, a stereo camera, a video camera, a laser-based camera, or any other suitable type of camera.

Computing device 102 can include a presentation notes component 104 that can facilitate generating presentation notes based upon gaze tracking information associated with observers of a presentation, and metadata and heuristics associated with the presentation. Examples, and additional aspects/details of presentation notes component 104 will be discussed below.

Referring again to FIG. 1, computing device 102 can also include or otherwise be associated with at least one memory 108 that can store computer executable components. By way of example only, such computer executable components can include, but are not limited to, presentation notes component 104 and associated components, and can store data generated by such presentation notes component 104 and/or associated components. Computing device 102 can also include or otherwise be associated with at least one processor 106 that executes the computer executable components stored in memory 108. Computing device 102 can further include a system bus 110 that can couple the various computing device 102 components including, but not limited to, the presentation notes component 104, memory 108 and/or processor 106. Although camera(s) 114 is depicted as separate from computing device 102, in some embodiments, camera(s) 114 can be part of computing device 102 and connected via system bus 110.

While a single computing device 102 is shown in FIG. 1, in some embodiments, any number of different types of devices can be associated with or include one or more components of computing device 102, e.g., include part or all of presentation notes component 104. For example, a device such as camera 114 can include all or some of the components of presentation notes component 104. All such embodiments are envisaged.

Computing device 102 can be any computing device that can be communicatively coupled to and/or include one or more cameras 114, non-limiting examples of which can include, but are not limited to, a wearable device or a non-wearable device. Wearable device can include, for example, heads-up display glasses, a monocle, eyeglasses, contact lens, sunglasses, a headset, a visor, a cap, a mask, a headband, clothing, or any other suitable device that can be worn by a human or non-human user. Non-wearable devices can include, for example, a mobile device, a mobile phone, a camera, a camcorder, a video camera, laptop computer, tablet device, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, a mainframe computer, a robotic device, a wearable computer, an artificial intelligence system, a network storage device, a communication device, a web server device, a network switching device, a network routing device, a gateway device, a network hub device, a network bridge device, a control system, or any other suitable computing device 102. It is to be appreciated that computing device 102 and/or camera 114 can be equipped with communication components (not shown) that enable communication between computing device 102 and/or camera 114 over one or more networks 112.

While embodiments disclosed herein refer to one or more live streams of images from one or more cameras 114, some embodiments can use one or more stored images.

The various devices (e.g., computing device 102, cameras 114) and components (e.g., presentation notes component 104, memory 108, processor 106 and/or other components) of system 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
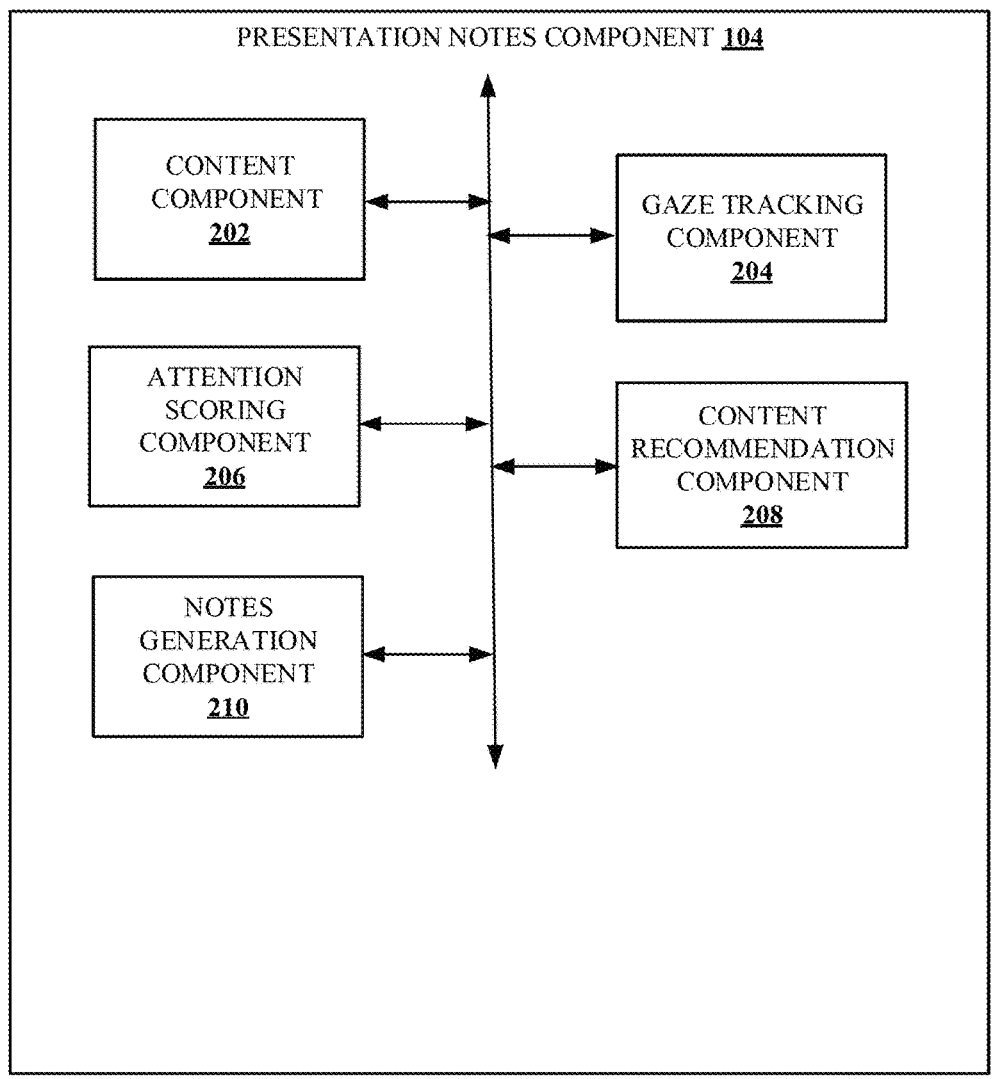
FIG. 2 illustrates an example, non-limiting, system component in accordance with one or more embodiments of the present invention.

FIG. 2 illustrates an example, non-limiting, presentation notes component 104 in accordance with one or more embodiments of the present invention. Repetitive description of like elements employed in one or more embodiments described herein is omitted for sake of brevity.

In one or more embodiments, the presentation notes component 104 can automatically generate presentation notes based upon gaze tracking information associated with observers of a presentation, and metadata and heuristics associated with the presentation. Presentation notes component 104 can include content component 202, gaze tracking component 204, attention scoring component 206, content recommendation component 208, and notes generation component 210.

Content component 202 can obtain a presentation, and metadata and heuristics associated with the presentation. Exemplary presentations will be discussed in more detail below, with reference to FIGS. 3-7. Gaze tracking component 204 can generate gaze tracking information for one or more observers of a presentation, based on one or more images captured from one or more cameras 114 (FIG. 1) directed at the observer(s) during the presentation. In some embodiments, gaze tracking component 204 can includes time stamped gaze points on presentation content (e.g., one or more slides) with unique observer identifiers corresponding to respective observers. An example of gaze points will be discussed in more detail with respect to FIG. 5. Attention scoring component 206 can determine respective attentions scores for content elements of a presentation 302, such using gaze tracking information, as will be discussed in more detail below. Content recommendation component 208 can determine content, from one or more content sources, for association with content elements and to include in presentation notes, as discussed in more detail below. Notes generation component 210 can generate presentation notes for a presentation 302 using respective content selected for content elements of presentation 302, as will also be discussed in more detail below.

Although FIGS. 1 and 2 depict components in computing device 102 as distinct, it is to be appreciated that two or more components can be implemented in a common component. Further, it is to be appreciated that the design of the computing device 102 can include other component selections, component placements, etc., to facilitate automatically generating presentation notes based upon gaze tracking information associated with observers of a presentation, and metadata and heuristics associated with the presentation in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 3:
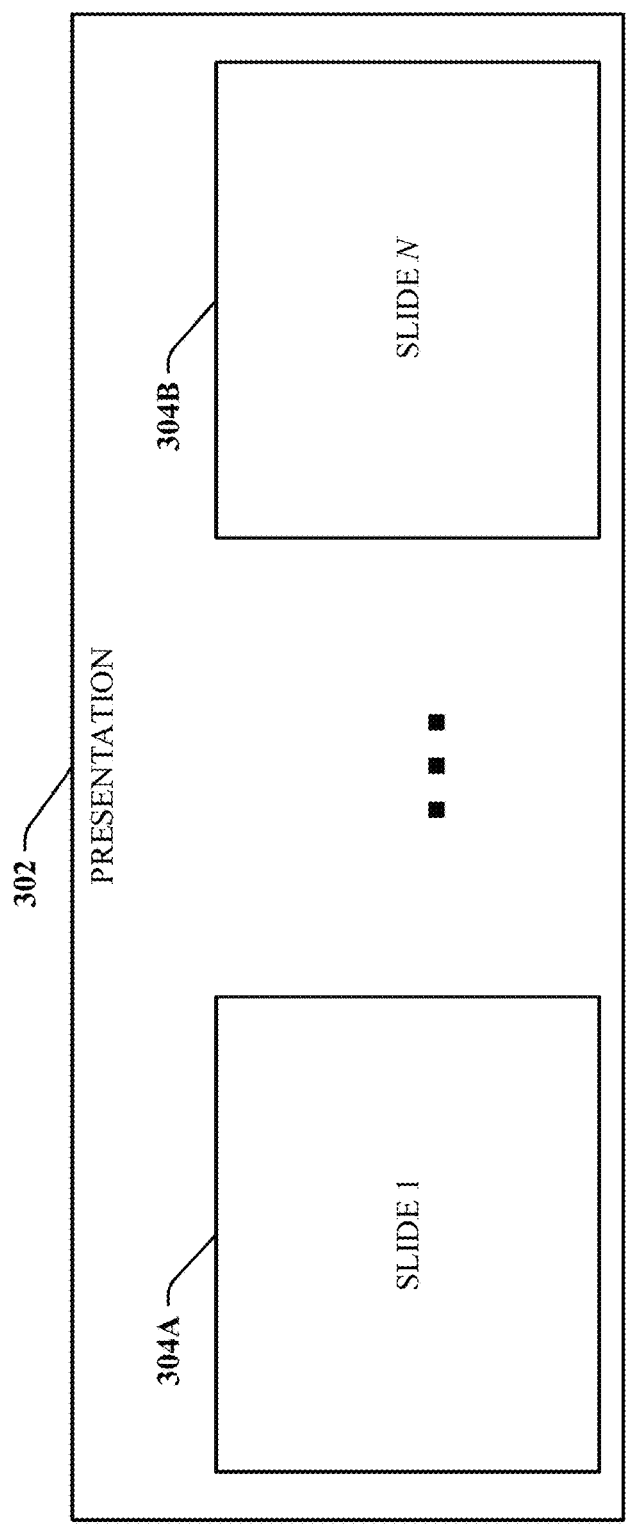
FIG. 3 illustrates an example, non-limiting, presentation in accordance with one or more embodiments of the present invention.

FIG. 3 illustrates an example, non-limiting, presentation 302 in accordance with one or more embodiments of the present invention. Presentation 302 contains content elements and includes slide 1 304A to ( . . . ) slide N 304B, where N is a positive integer representing the quantity of slides in presentation 302. Additional examples and details of Presentation 302, slide content and exemplary embodiment of the present invention will be discussed below.

Figure 4:
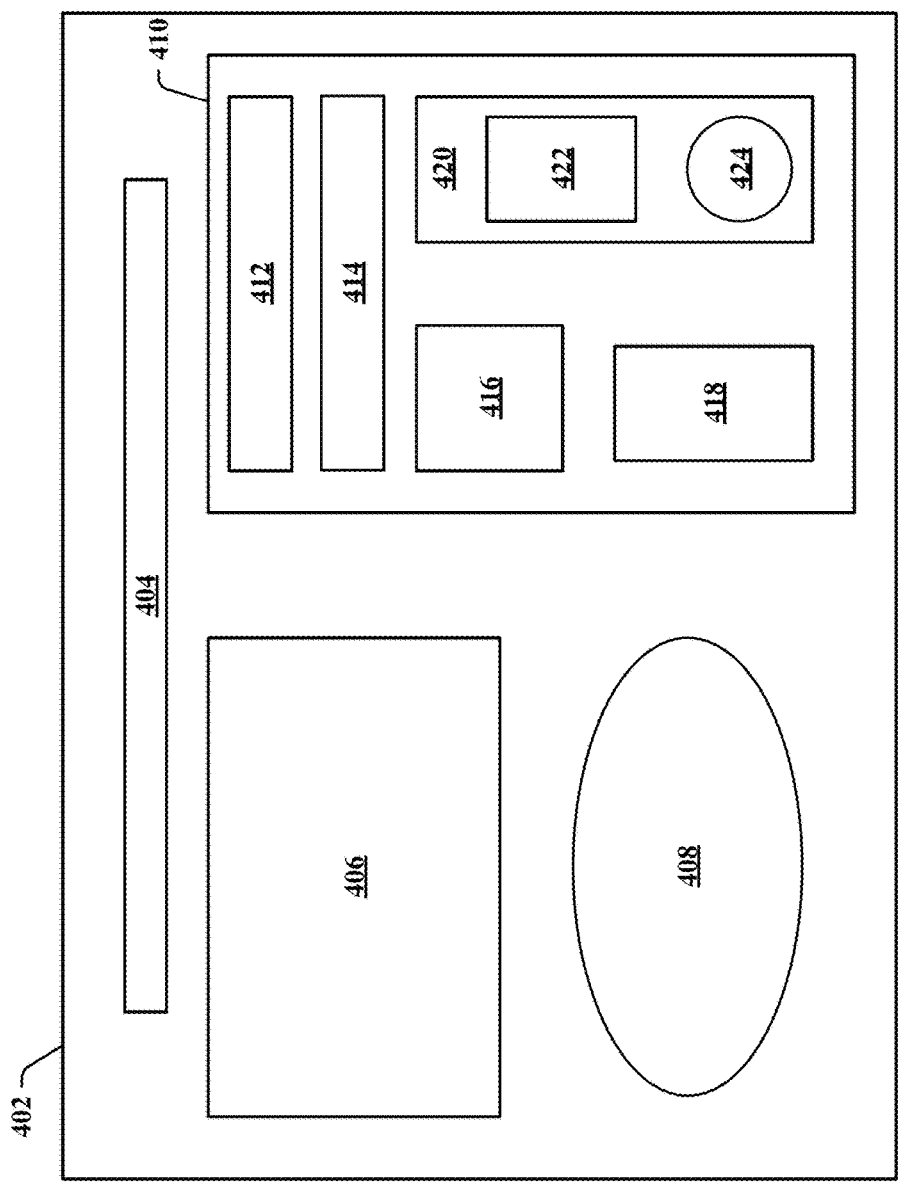
FIG. 4 illustrates an example, non-limiting, slide in accordance with one or more embodiments of the present invention.

FIG. 4 illustrates an example, non-limiting, slide 402 in accordance with one or more embodiments of the present invention. For example, slide 402 can represent a slide from presentation 302. Slide 402 can include content elements 404, 406, 408, 410, 412, 414, 416, 418, 420, 422, and 424. It is to be appreciated that a content element can include other content elements. For example, content element 410 includes content elements 412, 414, 416, 418, 420, 422, and

424. A content element can include any content that can presented in a presentation 302, non-limiting examples of which can include, textual content, image content, audio content, video content, animation content, or any other suitable content that can be presented in a presentation 302. It is to be appreciated that while eleven content elements are shown here for illustrative purposes, any suitable number of content elements can be included in a slide.

Content component 202 can obtain presentation 302 from a presentation source, non-limiting example of which can include a presenter, a teacher, a lecturer, an author of the presentation 302, a knowledge base, a content database, or any other suitable presentation source associated with the presentation 302.

Content component 202 can obtain metadata for respective content elements of the presentation 302 from the presentation source. In a non-limiting example, metadata can include a content type of the content element. Non-limiting example of content types can include, textual content, image content, audio content, video content, animation content, or any other suitable content type that can be presented in a presentation 302. Metadata can also include a topic t of the content element, which indicates the topic the content elements is associated with. Metadata can also include an importance level i of the content element, which indicates an importance of the content element for understanding the topic t. Metadata can also include an effort level e of the content element, which indicates an amount of effort in terms of attention of the observer to the content element for understanding the topic t. Metadata can also include a unique content identifier content-id for the content element.

In a non-limiting example, a professor can make a classroom presentation available to content component 202 and can provide metadata for content elements in the classroom presentation. For example, content component can provide a user interface (not shown) that allows the professor to tag content elements of the presentation with metadata. In another non-limiting example, the professor can embed the metadata in a presentation file of the presentation.

Content component 202 can obtain heuristics for the presentation 302 and/or respective content elements of the presentation 302 from the presentation source. In a non-limiting example, heuristics can include preferences for particular content types for presentation notes. For example, a presentation source can specify weights for respective content types indicative of their preference for the respective content types when generating presentation notes. Continuing with the professor example, the professor can rank content types in order of preference: 1—text, 2—video, 3—image. 4—audio, and 5—animation. It is to be appreciated that a presentation source can employ any suitable indication of preferences of content types.

In a non-limiting example, heuristics can also include preferences for particular sources (e.g., content sources) of content for presentation notes. For example, a presentation source can specify weights for respective content sources indicative of their preference for the respective content sources when generating presentation notes. In a non-limiting example, content sources can include, Internet, textbooks, books, articles, white papers, newspapers, blogs, television, movies, radio, massive open online course (MOOC) video, animations, audio recordings library, knowledge bases, content databases, or any other suitable source of content for presentation notes. Continuing with the professor example, the professor can weight content sources: 50% textbooks, 20% books, 15% knowledge bases. 10% Internet, and 5% MOOC, etc. . . . It is to be appreciated that a presentation source can employ any suitable indication of preferences of content sources.

In a further non-limiting example, heuristics can also include an attention function $f(a)$ for determining an attention score a and/or a content clarity function $f(c)$ for determining content clarity level c, both of which as discussed in more detail below. For example, a presentation source can specify attention function $f(a)$ and/or content clarity function $f(c)$ that presentation notes component 104 can employ for automatically generating presentation notes.

With reference now also to FIGS. 1-4, presentation notes component 104 can also include gaze tracking component 204 that can generate gaze tracking information for observers of presentation 302 based on images captured from one or more cameras 114 directed at the observers while presentation 302 is presented. For example, in some embodiments, gaze tracking component 204 can determine for respective slides of presentation 302, gaze tracking information e.g., time stamped gaze points for an observer. In some embodiments, the time stamped gaze points can include unique observer identifiers, e.g., for each of multiple observers.

Figure 5:
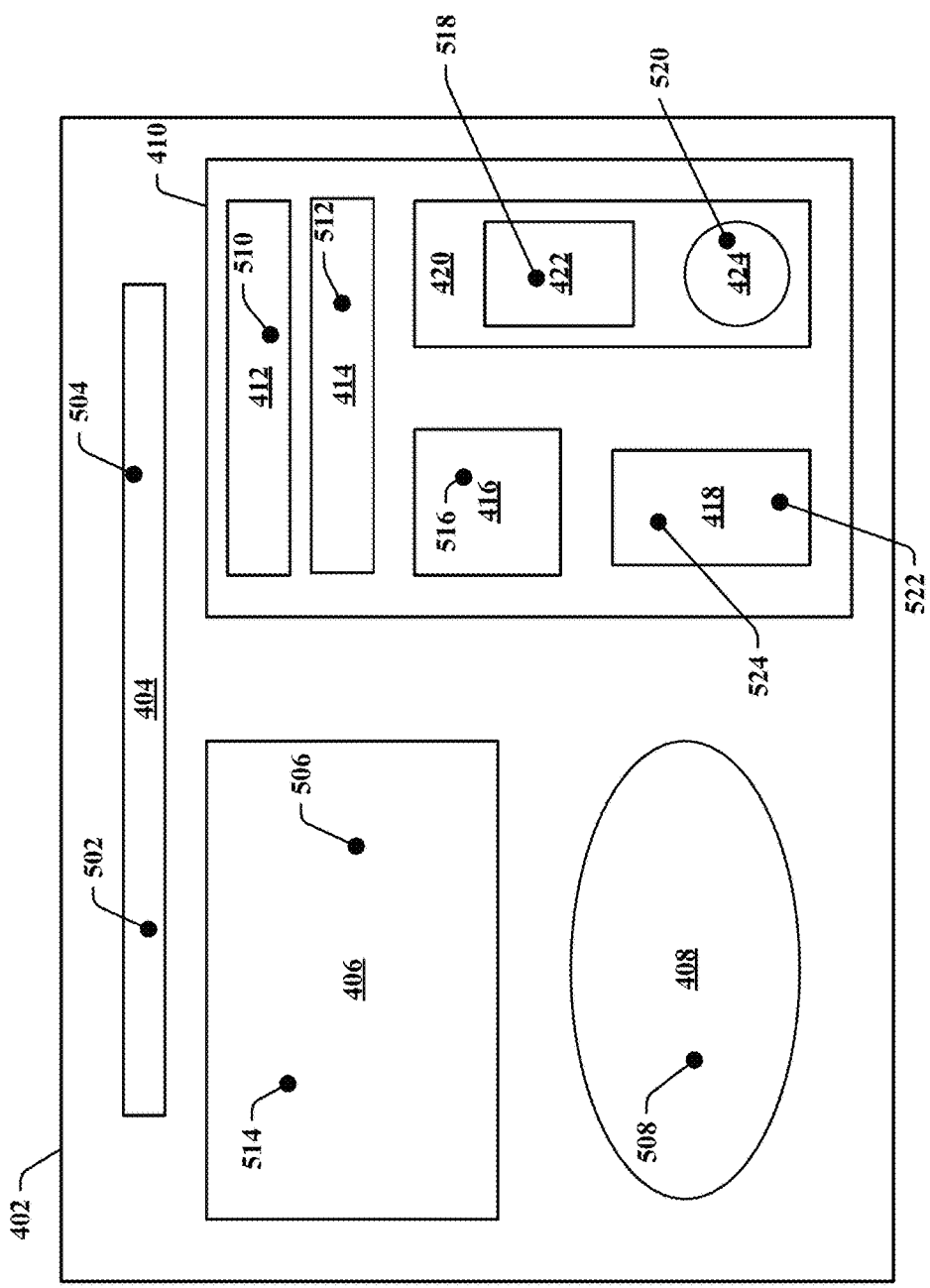
FIG. 5 illustrates an example, non-limiting, slide with gaze points in accordance with one or more embodiments of the present invention.

FIG. 5 illustrates an example, non-limiting, slide 402 from FIG. 4 with gaze points in accordance with one or more embodiments of the present invention. In a non-limiting example, slide 402 can include gaze points 502, 504, 506, 508, 510, 512, 514, 516, 518, 520, 522, and 524. It is to be appreciated that while twelve gaze points in shown here for illustrative purposes, any suitable number of gaze points can be determined by gaze tracking component 204 for a slide, such as in a non-limiting example, thousands or millions of gaze points.

With reference also to FIGS. 1-5, presentation notes component 104 can also include attention scoring component 206 that can determine respective attentions scores for content elements on slides of a presentation 302. In some embodiments, attention scoring component 206 can determine respective statistics for content elements based on gaze tracking information for use by an attention scoring function $f(a)$ to determine respective attention scores a for content elements. For example, attention scoring function $f(a)$ can specify particular statistics derived from the gaze tracking information that are employed for determining attention score a.

In a non-limiting example, attention scoring component 206 can determine a statistic for a content element including a number of fixations (NF) of observers for a fixation area associated with the content element. A fixation can refer to a collection of sequential gaze points of an observer that are within a defined area (e.g., fixation area) and occurring for at least a defined minimum amount of time. Attention scoring component 206 can determine fixations based on the gaze information. In a non-limiting example, a fixation area can comprise an area of the slide associated with a content element from which a fixation can be determined. For example, if a first observer has a fixation on the fixation area once and them looks away and has another fixation on the fixation area and then looks away again, and doesn't have another fixation on the fixation area, then there are two fixations for the observer on the fixation area. If there are two observers, and the second observer has three fixations on the fixation area, then the number of fixations (NF) for the content element would be five.

Figure 6:
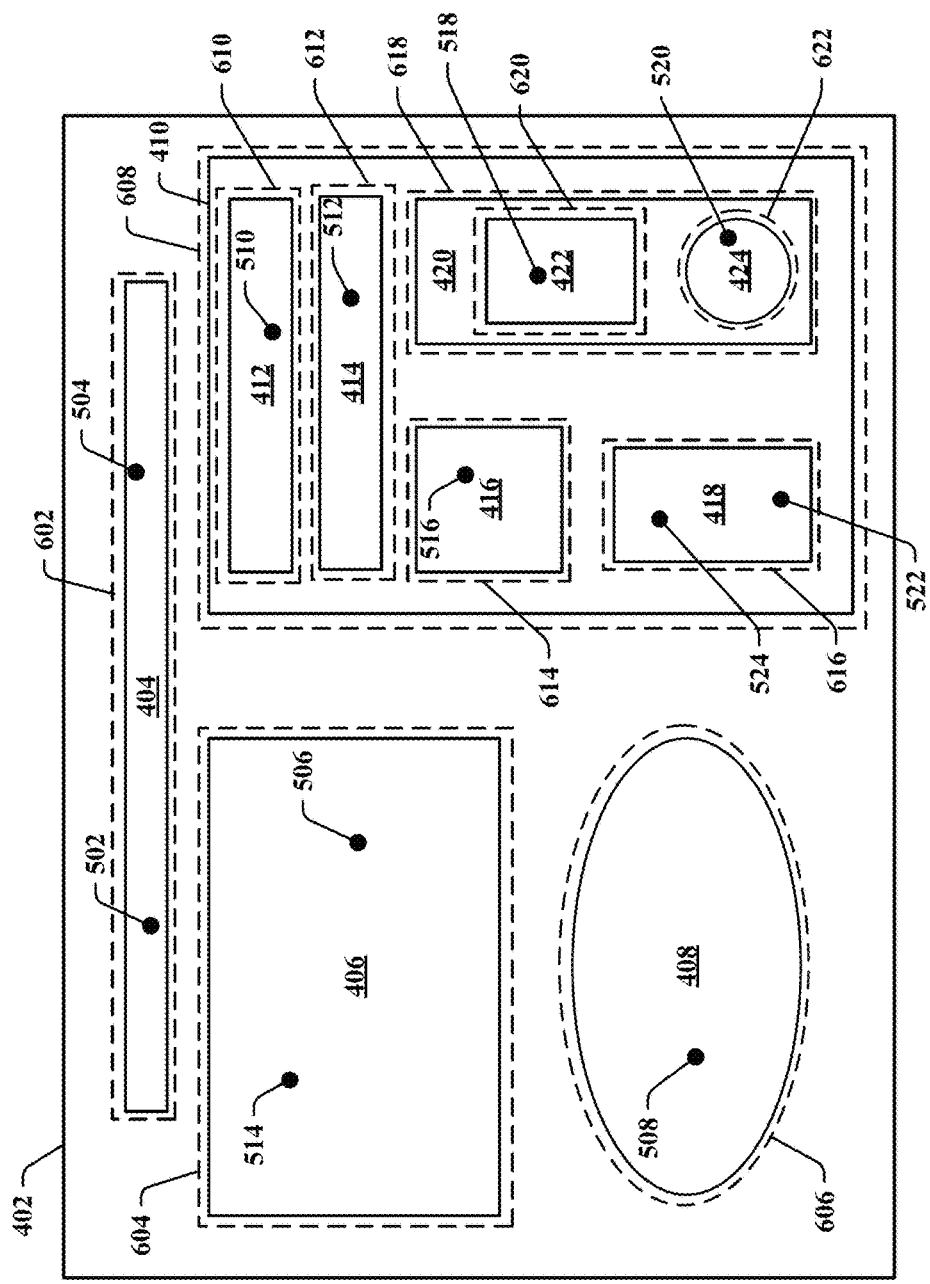
FIG. 6 illustrates an example, non-limiting, slide with fixation areas in accordance with one or more embodiments of the present invention.

FIG. 6 illustrates an example, non-limiting, slide 402 from FIG. 5 with fixation areas in accordance with one or more embodiments of the present invention. As depicted, slide 402 includes fixation areas 602, 604, 606, 608, 610, 612, 614, 616, 618, 620, and 622. In this example, fixation areas can correspond to content elements. For example: fixation area 602 corresponds to content element 404; fixation area 604 corresponds to content element 406; fixation area 606 corresponds to content element 408; fixation area 608 corresponds to content element 410; fixation area 610 corresponds to content element 412; fixation area 612 corresponds to content element 414; fixation area 614 corresponds to content element 416; fixation area 616 corresponds to content element 418; fixation area 618 corresponds to content element 420; fixation area 620 corresponds to content element 422; and fixation area 622 corresponds to content element 424. It is to be appreciated that while eleven fixation areas are shown as corresponding to eleven content elements, any suitable number (more or less) of fixation areas and/or combinations/correspondence variations can be employed.

In another non-limiting example, attention scoring component 206 can also determine another statistic for a content element including a total fixation duration (TFD) of observers for a fixation area associated with the content element. The total fixation duration (TFD) for the content element includes the total time spent on the fixations of the number of fixations (NF) for the content element. Continuing with the two observer example, if the first observer spent 1 second on the first fixation and 3 seconds on the second fixation, and the second observer spent 2 seconds on the first fixation, 1 second on the second fixation, and 5 seconds on the third fixation, then the total fixation duration (TFD) for the content element would be 12 seconds.

In further non-limiting example, attention scoring component 206 can also determine another statistic for a content element including an average fixation duration (AFD) of observers for a fixation area associated with the content element. The average fixation duration (AFD) for the content element can be determined by dividing the total fixation duration (TFD) for the content element by the number of fixations (NF) for the content element.

In an additional non-limiting example, attention scoring component 206 can also determine another statistic for a content element including a percentage viewing time (PVT) of observers for a fixation area associated with the content element. To determine the percentage viewing time (PVT) for the content element, attention scoring component 206 can determine a total time tracked (TTT) for a slide on which the content element resides, by adding the total fixation duration (TFD) for all content elements on the slide. The percentage viewing time (PVT) for the content element can be determined by dividing the total fixation duration (TFD) for the content element by the total time tracked (TTT) for the slide on which the content element resides.

In another non-limiting example, attention scoring component 206 can also determine another statistic for a content element including a cluster average of saccade paths (ASP) of observers for a fixation area associated with the content element. A saccade path can refer to a transition path (e.g., a vector in the coordinate space) of an observer's gaze from one fixation to another fixation. Attention scoring component 206 can determine saccade paths based on the gaze information. Attention scoring component 206 can employ any suitable clustering algorithm to cluster saccade paths associated with a content element. It is to be appreciated that attention scoring component 206 can determine a cluster of saccade paths for a content element based on saccade paths directed towards the content element, saccade paths directed away from the content element, or both saccade paths directed towards and away from the cluster element. Attention scoring component 206 can determine respective representative saccade paths for the clusters. In a non-limiting example, a representative saccade path for a cluster can be an average saccade path for the cluster. Attention scoring component 206 can generate a cluster average of saccade paths (ASP) for a content element which comprises a set of representative saccade paths for the clusters associated with the content element.

Figure 7:
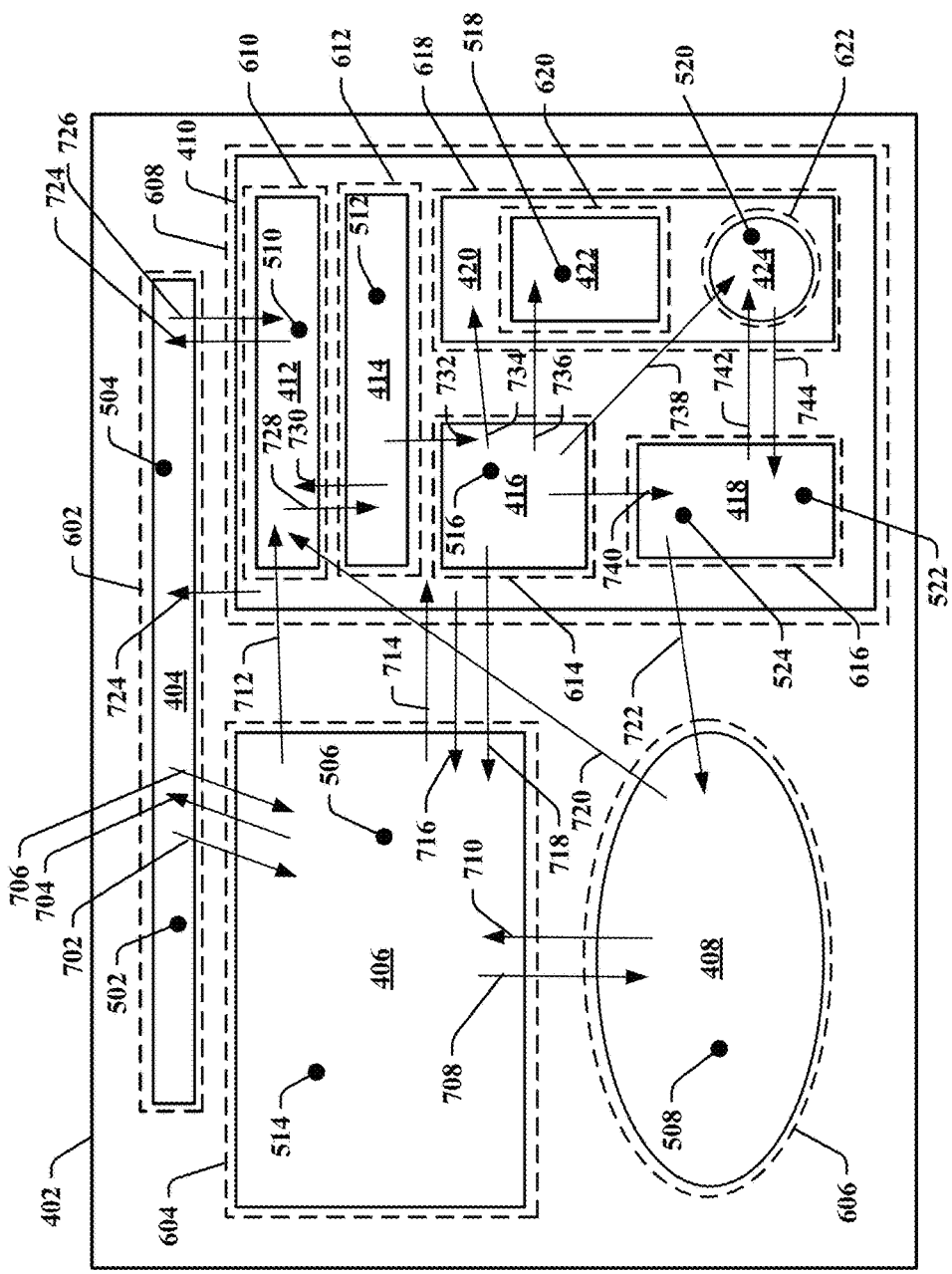
FIG. 7 illustrates an example, non-limiting, slide with saccade paths identified in accordance with one or more embodiments of the present invention.

FIG. 7 illustrates an example, non-limiting, slide 402 from FIG. 6 with saccade paths in accordance with one or more embodiments of the present invention. As depicted, slide 402 can include saccade paths 702, 704, 706, 708, 710, 712, 714, 716, 718, 720, 722, 724, 726, 728, 730, 732, 734, 736, 738, 740, 742, and 744. For example, saccade path 702 corresponds to a gaze transition from fixation area 602 to fixation area 604, saccade path 714 corresponds to a gaze transition from fixation area 604 to fixation area 608, and saccade path 724 corresponds to a gaze transition from fixation area 610 (which is within fixation area 608) to fixation area 602. It is to be appreciated that while twenty-two saccade paths are shown here for illustrative purposes, any suitable number of saccade paths can be determined.

Using one or more of the statistics described above and/or other statistics or metadata, attention scoring component 206, can determine attention score a for a content element using attention function $f(a)$. It is to be appreciated that attention function $f(a)$ can be specified by a presentation source, predefined in the system, or dynamically determined using artificial intelligence algorithms. For example, attention scoring component 206 can employ deep learning models to determine an attention function $f(a)$ that is more effective (e.g., improves or optimizes) for generating presentation notes, such as in a non-limiting example, for a particular set of observers, for a particular presentation topic, for a particular presentation source, for a particular content type, or using any other suitable criteria.

Attention scoring component 206 can generate respective tuples (contentid, i, e, a) for the content elements that include the unique content identifier content-id for the content element, the importance level i of the content element, the effort level e of the content element, and the attention score a for the content element.

Presentation notes component 104 can also include content recommendation component 208 that can determine content, from one or more content sources, for association with content elements and to include in presentation notes based on a content clarity function $f(c)$ for determining respective content clarity levels c for the content elements. For example, content clarity function $f(c)$ can be a function based on the importance level i of the content element, the effort level e of the content element, the attention score a for the content element, and/or the heuristics. It is to be appreciated that content clarity function $f(c)$ can be specified by a presentation source, predefined in the system, or dynamically determined using artificial intelligence algorithms. For example, content recommendation component 208 can employ deep learning models to determine a content clarity function $f(c)$ that is more effective for generating presentation notes, such as in a non-limiting example, for a particular set of observers, for a particular presentation topic, for a particular presentation source, for a particular content type, or using any other suitable criteria.

In a non-limiting example, using the content clarity function $f(c)$, content recommendation component 208 can determine a content clarity level c for a content element based on a low attention score a for the content element, a high importance level i of the content element, and a high effort level e of the content element, that would indicate a low level of understanding of the content element and a need to add greater level of content in the presentation notes for the content element, than an amount of content in the presentation notes for another content element with a content clarity level c indicative of a higher level of understanding of the other content element.

Based on the content clarity level c determined for a content element, content recommendation component 208 can determine content to include in the presentation notes for the content element. For example, based on respective content clarity levels c determined for content elements in a presentation 302, content recommendation component 208 can determine respective content to include in generated presentation notes associated with presentation 302 for the content elements.

Presentation notes component 104 can also include notes generation component 210 that can generate presentation notes for a presentation 302 using respective content selected for content elements of presentation 302. In a non-limiting example, notes generation component 210 can employ respective content selected by content recommendation component 208 for content elements to generate presentation notes that follow an order of the presentation 302. In an example, content selected by content recommendation component 208 for content elements to can be incorporated directly into presentation 302 to generate presentation notes. In another example, notes generation component 210 can generate a document that presents content elements along with content selected by content recommendation component 208 for the content elements. In a further example, the presentation can be ordered by content clarity levels c of the content elements, attention scores a of the content elements, importance levels i of the content elements, effort levels e of the content elements, or some combination and/or function thereof. It is to be appreciated that presentation notes can be generated in any suitable format.

Furthermore, notes generation component 210 can automatically transmit the generated presentation notes to one or more observers of the presentations. In addition, notes generation component 210 can cause a device associated with an observer to display portions of the generated notes on a display as the observer is reviewing presentation 302. In another example, notes generation component 210 can cause a device to trigger an action that draws the attention of observer to a generated presentation note in response to determining the observer has a low level of understanding of the content element associated with the presentation note and a gaze vector associated with the observer does not intersect with a portion of a display associated with the content element and/or presentation note.

In another example, notes generation component 210 can send a transmission including the generated presentation notes to a device that initiates the device to perform an action based on the generated presentation notes. For example, notes generation component 210 can send a transmission including the generated presentation notes to a robotic device that initiates the robotic device to assist an observer associated with presentation 302 in learning.

Some embodiments can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 8:
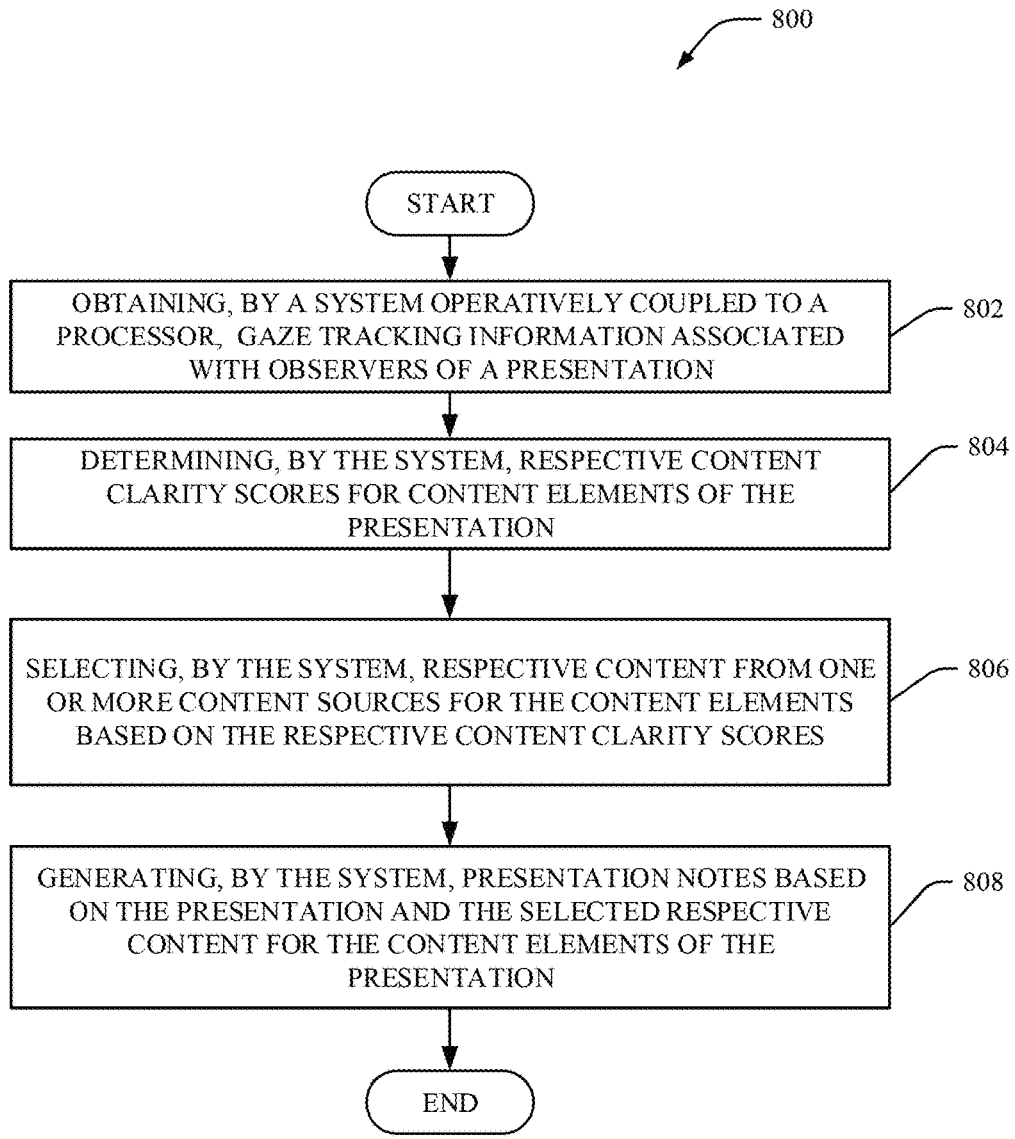
FIG. 8 illustrates an example, non-limiting, computer-implemented method in accordance with one or more embodiments of the present invention.

FIG. 8 illustrates an example, non-limiting computer-implemented method in accordance with one or more embodiments of the present invention. Repetitive description of like elements employed in other embodiments described herein is omitted for sake of brevity.

At 802, method 800 can comprise obtaining, by a system operatively coupled to a processor, gaze tracking information associated with observers of a presentation (e.g., via a gaze tracking component 204, a presentation notes component 104, and/or a computing device 102). At 804, method 800 can comprise determining, by the system, respective content clarity scores for content elements of the presentation (e.g., via a content component 202, an attention scoring component 206, a content recommendation component 208, a presentation notes component 104, and/or a computing device 102). At 806, method 800 can comprise selecting, by the system, respective content from one or more content sources for the content elements based on the respective content clarity scores (e.g., via a content recommendation component 208, a presentation notes component 104, and/or a computing device 102). At 808, method 800 can comprise generating, by the system, presentation notes based on the presentation and the selected respective content for the content elements of the presentation (e.g., via a notes generation component 210, a presentation notes component 104, and/or a computing device 102).

Figure 9:
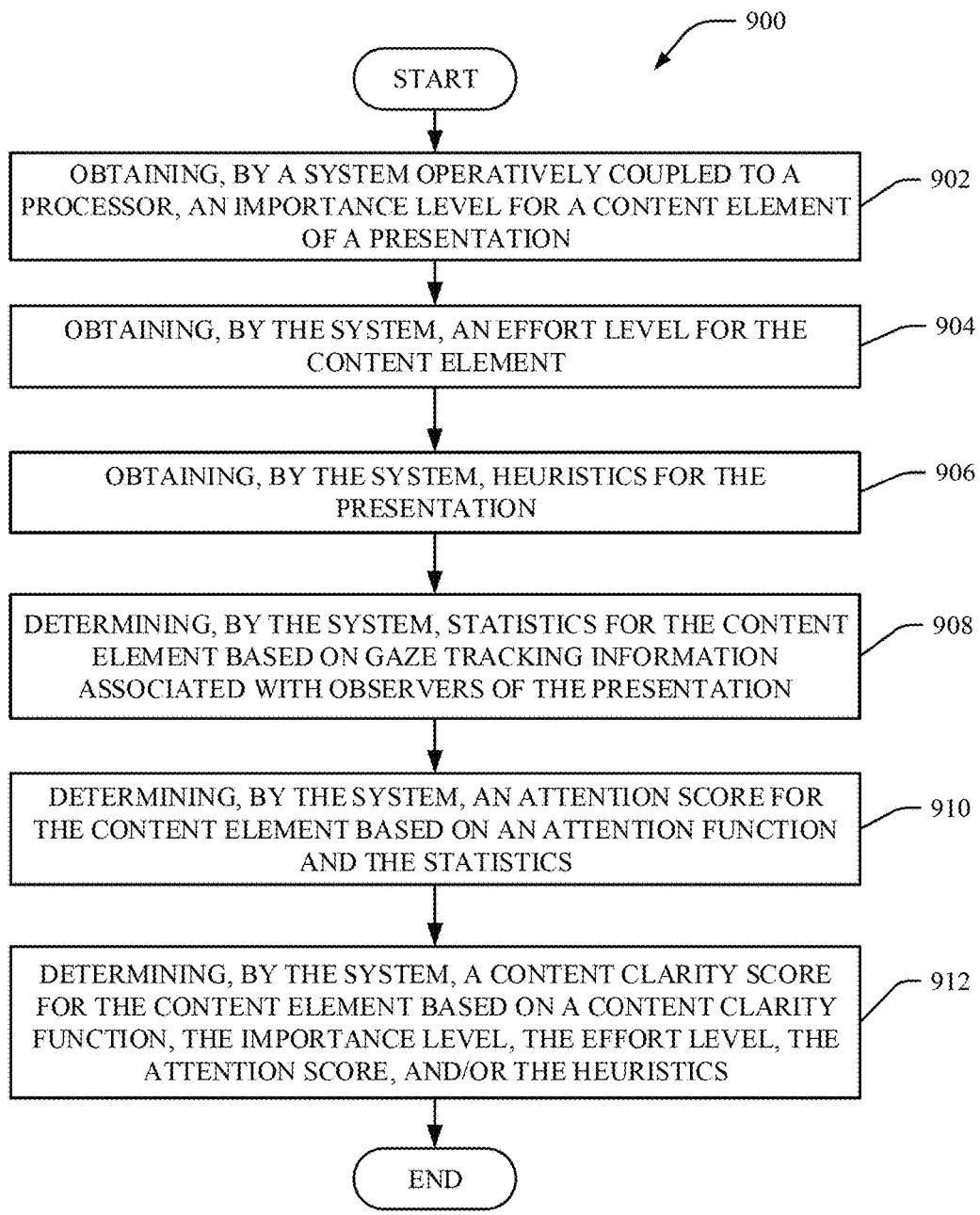
FIG. 9 illustrates another exemplary, non-limiting computer-implemented method in accordance with one or more embodiments of the present invention.

FIG. 9 illustrates an example, non-limiting computer-implemented method in accordance with one or more embodiments of the present invention. In a non-limiting example, method 900 can be employed at step 804 of method 800. Repetitive description of like elements employed in other embodiments described herein is omitted for sake of brevity.

At 902, method 900 can comprise obtaining, by a system operatively coupled to a processor, an importance level for a content element of a presentation (e.g., via a content component 202, a presentation notes component 104, and/or a computing device 102). At 904, method 900 can comprise obtaining, by the system, an effort level for the content element (e.g., via a content component 202, a presentation notes component 104, and/or a computing device 102). At 906, method 900 can comprise obtaining, by the system, heuristics for the presentation (e.g., via a content component 202, a presentation notes component 104, and/or a computing device 102). At 908, method 900 can comprise determining, by the system, statistics for the content element based on gaze tracking information associated with observers of the presentation (e.g., via an attention scoring component 206, a gaze tracking component 204, a presentation notes component 104, and/or a computing device 102). At 910, method 900 can comprise determining, by the system, an attention score for the content element based on an attention function and the statistics (e.g., via an attention scoring component 206, a presentation notes component 104, and/or a computing device 102). At 912, method 900 can comprise determining, by the system, a content clarity score for the content element based on a content clarity function, the Importance level, the effort level, the attention score, and/or the heuristics (e.g., via a content recommendation component 208, a presentation notes component 104, and/or a computing device 102).

One or more processes in accordance with the present invention can be performed by one or more computers (e.g., computer 102) specifically adapted (or specialized) for carrying out defined tasks related to automatically generating recommended query terms that are specialized to a topic of desired information based on a query associated with a user.

For simplicity of explanation, computer-implemented methodologies in accordance with the present invention are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
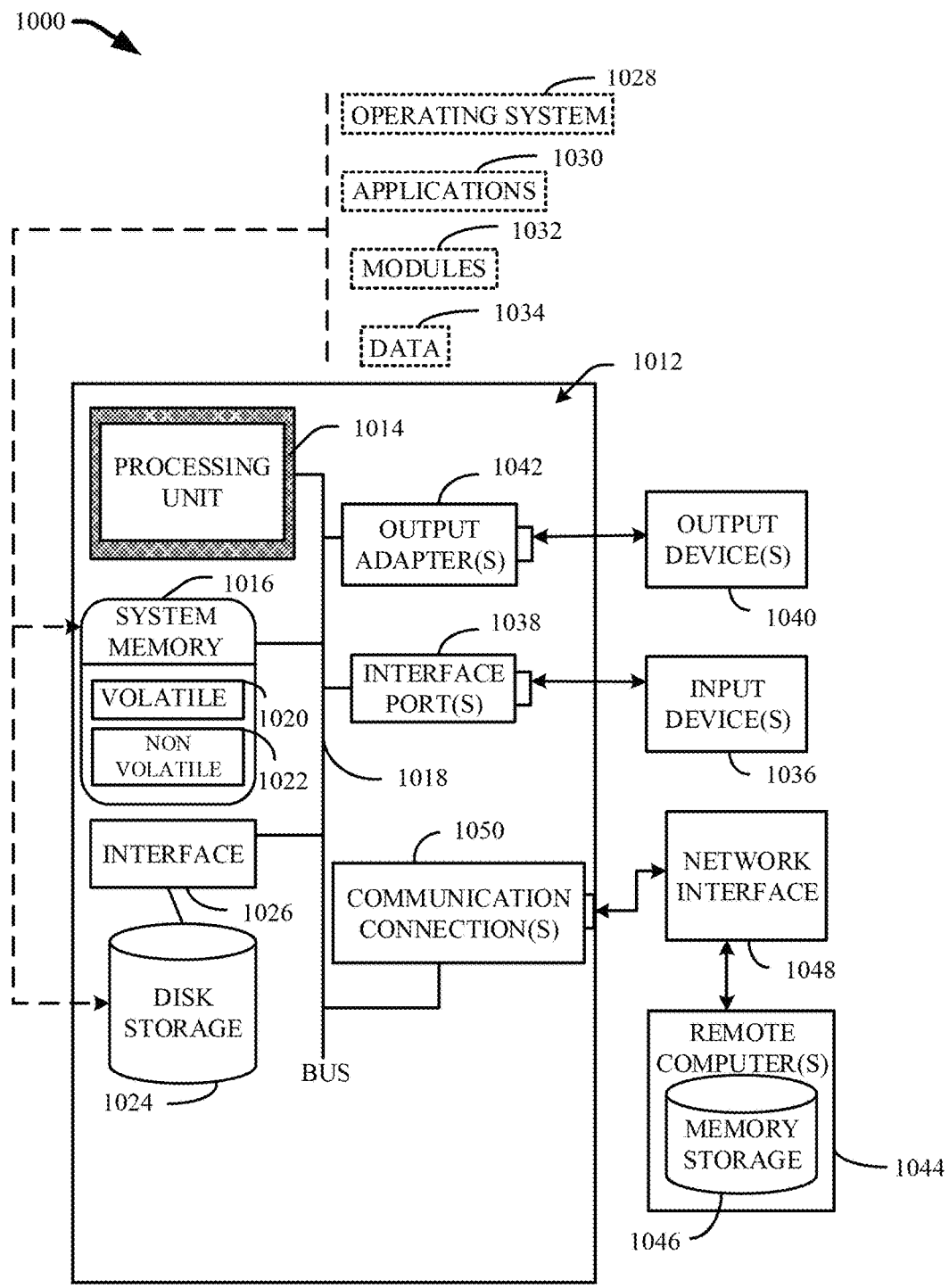
FIG. 10 illustrates an example, non-limiting operating environment in accordance with one or more embodiments of the present invention.

In order to better provide context for various aspects of the invention, FIG. 10, as well as the following discussion, are intended to provide a general description of a suitable environment in which the various aspects of the disclosed subject matter can be implemented. FIG. 10 illustrates an example, non-limiting operating environment in accordance with one or more embodiments of the present invention. Repetitive description of like elements employed in other embodiments described herein is omitted for sake of brevity.

With reference to FIG. 10, operating environment 1000 can include a computer 1012. The computer 1012 (similar to the example computing device 102 of FIG. 1) can also include a processing unit 1014, a system memory 1016, and a system bus 1018. The system bus 1018 operably couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). The basic input/output system (BIOS), containing the basic routines to transfer information between elements within the computer 1012, such as during start-up, can also be stored in nonvolatile memory 1022.

Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026.

Operating environment 1000 can also include software that acts as an intermediary between users and the basic computer resources described in operating environment 1000. Such software can also include, for example, an operating system 1028. Operating system 1028, which can be stored on disk storage 1024, acts to control and allocate resources of the computer 1012. Applications 1030 can take advantage of the management of resources by operating system 1028 through program modules 1032 and program data 1034, e.g., stored either in system memory 1016 or on disk storage 1024. In some embodiments, applications 1030 include one or more aspects presentation notes component 104 (FIG. 1) and/or embody one or more of the processes described with reference to FIG. 7 and/or FIG. 8.

It is to be appreciated that this invention can be implemented with various operating systems or combinations of operating systems. Referring again to FIG. 10, commands or information can be input to the computer 1012 through input device(s) 1036. Examples of input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. The input devices (and possibly other devices) can connect to processing unit 1014 through the system bus 1018 via interface port(s) 1038. Interface port(s) 1038 include, for example, a serial port, a parallel port, a game port, and a universal serial bus (USB). Output device(s) 1040 can use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

In an embodiment, for example, computer 1012 can perform operations comprising: obtaining gaze information associated with observers of a presentation, determining respective content clarity scores for content elements of the presentation based on a content clarity function, selecting respective content from one or more content sources for the content elements based on the respective content clarity scores, and generating presentation notes based on the presentation and the selected respective content for the content elements of the presentation.

It is to be appreciated that operations of embodiments disclosed herein can be distributed across multiple (local and/or remote) systems.

It is also to be understood that some computer processing systems, computer-implemented methods, computer apparatuses, and/or computer program products in accordance with the present invention can be employed to solve new technical problems that arise e.g., through advancements in technology, computer networks, the Internet and the like. Moreover, some computer processing systems, methods apparatuses and/or computer program products in accordance with the present invention can provide technical improvements by automatically generating presentation notes based upon gaze tracking information associated with observers of a presentation, and metadata and heuristics associated with the presentation. A few examples of such improvements include: improving processing efficiency among processing components in applicable systems; reducing delay in processing performed by applicable processing components, and/or improving the accuracy in which the applicable systems automatically generate presentation notes based upon gaze tracking information associated with observers of a presentation, and metadata and heuristics associated with the presentation.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this invention also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this invention can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this invention, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this invention, but one of ordinary skill in the art can recognize that many further combinations and permutations of this invention are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components;
 a processor, operably coupled to the memory, and that executes computer executable components stored in the memory, wherein the computer executable components comprise:
  a gaze tracking component that obtains gaze information associated with observers of a presentation;
  an attention scoring component that determines respective attention scores for content elements of the presentation based on the gaze information, wherein the attention scoring component determines an attention score for a content element of the content elements based on an attention function that employs a cluster average of saccade paths for the content element determined based on the gaze information, wherein the cluster average of saccade paths comprises a set of respective representative saccade paths for clusters of saccade paths associated with the content element;

a content recommendation component that:
determines respective content clarity scores for content elements of the presentation based on a content clarity function and the gaze information, wherein the content clarity function employs the attention score for the content element; and
selects respective content, from one or more content sources, for the content elements based on the respective content clarity scores; and a notes generation component that generates presentation notes based on the presentation and the selected respective content for the content elements of the presentation.

2. The system of claim 1, wherein the notes generation component further controls a device associated with an observer to display the presentation notes as the observer is reviewing the presentation.

3. The system of claim 1, wherein the attention function further employs one or more statistics selected from a group consisting of a total fixation duration for the content element, a number of fixations for the content element, an average fixation duration for the content element, and a percentage viewing time for the content element.

4. The system of claim 1, further comprising a content component that obtains respective importance levels for the content elements, wherein the content clarity function further employs an importance level for the content element.

5. The system of claim 1, further comprising a content component that obtains respective effort levels for the content elements, wherein the content clarity function further employs an effort level for the content element.

6. The system of claim 1, further comprising a content component that obtains a heuristic for the content element, wherein the content clarity function further employs the heuristic for the content element.

7. The system of claim 1, wherein the content recommendation component determines the content clarity function based upon a deep learning model that is optimized for learning for the observers.

8. A computer program product facilitating generation of presentation notes for a presentation, the computer program product comprising a computer readable storage medium having program instructions embodied therewith, the program instructions executable by a processor to cause the processing component to:

obtain gaze information associated with observers of a presentation;
determine respective attention scores for content elements of the presentation based on the gaze information, wherein the determining an attention score for a content element of the content elements is based on an attention function that employs a cluster average of saccade paths for the content element determined based on the gaze information, wherein the cluster average of saccade paths comprises a set of respective representative saccade paths for clusters of saccade paths associated with the content element;
determine respective content clarity scores for content elements of the presentation based on a content clarity function and the gaze information, wherein the content clarity function employs the attention score for the content element;
select respective content, from one or more content sources, for the content elements based on the respective content clarity scores; and
generate presentation notes based on the presentation and the selected respective content for the content elements of the presentation.

9. The computer program product of claim 8, wherein the program instructions executable by the processor further cause the processor to:
control a device associated with an observer to display the presentation notes as the observer is reviewing the presentation.

10. The computer program product of claim 9, wherein attention function further employs one or more statistics selects from a group consisting of a total fixation duration for the content element, a number of fixations for the content element, an average fixation duration for the content element, and a percentage viewing time for the content element.

11. The computer program product of claim 8, wherein the program instructions executable by the processor further cause the processor to:
obtain respective importance levels for the content elements, wherein the content clarity function further employs an importance level for the content element.

12. The computer program product of claim 11, wherein the program instructions executable by the processor further cause the processor to:
obtain respective effort levels for the content elements, wherein the content clarity function further employs an effort level for the content element.

13. The computer program product of claim 11, wherein the program instructions executable by the processor further cause the processor to:
obtain a heuristic for the content element, wherein the content clarity function further employs the heuristic for the content element.

* * * * *